US008452603B1

(12) United States Patent
Liu et al.

(10) Patent No.: US 8,452,603 B1
(45) Date of Patent: May 28, 2013

(54) METHODS AND SYSTEMS FOR ENHANCEMENT OF DEVICE ACCESSIBILITY BY LANGUAGE-TRANSLATED VOICE OUTPUT OF USER-INTERFACE ITEMS

(75) Inventors: Mindy Liu, Santa Clara, CA (US); Xin Zheng, Sunnyvale, CA (US); Kaihua Zhu, Sunnyvale, CA (US); Ning Wang, Sunnyvale, CA (US); Joshua Zhu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/615,750

(22) Filed: Sep. 14, 2012

(51) Int. Cl.
*G06F 17/28* (2006.01)
*G06F 3/16* (2006.01)
*G10L 13/02* (2006.01)

(52) U.S. Cl.
USPC ............... 704/277; 704/3; 704/260; 715/264; 715/727

(58) Field of Classification Search
USPC .......... 704/2, 3, 258, 260, 271, 277; 715/264, 715/265, 703, 727
See application file for complete search history.

(56) References Cited

U.S. PATENT DOCUMENTS

| | | | | |
|---|---|---|---|---|
| 4,974,191 A * | 11/1990 | Amirghodsi et al. | ............. | 704/8 |
| 5,416,903 A * | 5/1995 | Malcolm | ....................... | 715/703 |
| 5,974,372 A * | 10/1999 | Barnes et al. | ..................... | 704/8 |
| 6,559,861 B1 * | 5/2003 | Kennelly et al. | .............. | 715/703 |
| 6,559,866 B2 * | 5/2003 | Kolde et al. | .................... | 715/765 |
| 6,996,777 B2 * | 2/2006 | Hiipakka | ...................... | 715/727 |
| 7,039,867 B1 * | 5/2006 | Scheidig | ........................ | 715/703 |
| 7,050,979 B2 * | 5/2006 | Mizutani et al. | .............. | 704/277 |
| 7,103,841 B2 * | 9/2006 | Ronkainen et al. | ........... | 715/727 |
| 7,194,411 B2 * | 3/2007 | Slotznick et al. | ............. | 704/271 |
| 7,480,865 B2 * | 1/2009 | Lin | ............................... | 715/727 |
| 7,496,498 B2 * | 2/2009 | Chu et al. | .......................... | 704/4 |
| 7,788,100 B2 * | 8/2010 | Slotznick et al. | .......... | 704/270.1 |
| 7,849,144 B2 * | 12/2010 | Prajapat et al. | ............... | 709/206 |
| 8,015,009 B2 * | 9/2011 | Harband et al. | .............. | 704/260 |
| 8,037,414 B2 * | 10/2011 | Michaelis et al. | ............ | 715/729 |
| 8,335,682 B2 * | 12/2012 | Zou | .................................. | 704/8 |
| 2004/0078416 A1 * | 4/2004 | Kawasaki et al. | ............. | 708/672 |
| 2004/0111272 A1 | 6/2004 | Gao et al. | | |
| 2007/0061132 A1 * | 3/2007 | Bodin et al. | .................. | 704/200 |
| 2008/0072154 A1 * | 3/2008 | Michaelis et al. | ............ | 715/727 |
| 2008/0229206 A1 | 9/2008 | Seymour et al. | | |
| 2009/0013254 A1 * | 1/2009 | Walker et al. | ................. | 715/727 |
| 2009/0306985 A1 * | 12/2009 | Roberts et al. | ................ | 704/258 |
| 2010/0231752 A1 * | 9/2010 | Lodge | ......................... | 348/231.4 |
| 2011/0029876 A1 * | 2/2011 | Slotznick et al. | ............. | 715/727 |
| 2012/0116778 A1 | 5/2012 | Fleizach et al. | | |

* cited by examiner

*Primary Examiner* — Martin Lerner
(74) *Attorney, Agent, or Firm* — McDonnell Boehnen Hulbert & Berghoff LLP

(57) ABSTRACT

Methods and systems for enhancement of device accessibility are described. In an example, an operating system configured to be executed on a device, may be configured to support a plurality of software applications and to support a plurality of modes of operation of the device. A given software application may include a user-interface comprising a user-interface item having a text in a first language. The operating system may be configured to receive a selection of the user-interface item of the given software application. Based on the operating system being in an accessibility mode common to the plurality of software applications, the operating system may be configured to determine a translation of the text into a second language; and a voice output corresponding to a spoken utterance of the translation of the text. The operating system further may be configured to provide, by the device, the voice output.

18 Claims, 7 Drawing Sheets

METHODS AND SYSTEMS FOR ENHANCEMENT OF DEVICE ACCESSIBILITY BY LANGUAGE-TRANSLATED VOICE OUTPUT OF USER-INTERFACE ITEMS

BACKGROUND

Accessibility is a general term used to describe the degree to which a product, device, service, or environment is available to as many people as possible. Accessibility can be viewed as the "ability to access" and benefit from some system or entity. Accessibility is often used to focus on people's right of access to entities, often through use of assistive technology.

Speech recognition/synthesis devices and software can improve technology access. An example voice interface includes a speech-to-text system (or text-to-speech (TTS) system) that converts speech into text (or text into speech). Other systems are available that may render symbolic linguistic representations like phonetic transcriptions into speech to facilitate voice interfacing. Speech synthesis can be defined as an artificial production of human speech. A computer system used for this purpose is called a speech synthesizer, and can be implemented in software or hardware.

BRIEF SUMMARY

The present application discloses systems and methods for enhancement of device accessibility. In one aspect, a method performed by a device having an operating system and a plurality of software applications is described. The method may comprise switching, from a normal mode of the operating system, into an accessibility mode of the operating system, and the accessibility mode may be common to the plurality of software applications. The method also may comprise receiving a selection of a user-interface item of a user-interface of a given software application, and the user-interface item may have a text in a first language. The method further may comprise, based on the operating system being in the accessibility mode, obtaining, by the operating system in response to the selection, a translation of the text into a second language. The method also may comprise obtaining a voice output corresponding to a spoken utterance of the translation of the text; and providing, by the device, the voice output.

In another aspect, a computer readable medium having stored thereon instructions that, when executed by one or more processors of a computing device having an operating system and a plurality of software applications, cause the computing device to perform functions is described. The functions may comprise switching, from a normal mode of the operating system, into an accessibility mode of the operating system, and the accessibility mode may be common to the plurality of software applications. The functions also may comprise receiving a selection of a user-interface item of a user-interface of a given software application, and the user-interface item may have a text in a first language. The functions further may comprise, based on the operating system being in the accessibility mode, obtaining, by the operating system in response to the selection, a translation of the text into a second language. The functions also may comprise obtaining a voice output corresponding to a spoken utterance of the translation of the text; and providing the voice output.

In still another aspect, a device having an operating system and a plurality of software applications is described. The device may comprise one or more processors. The device also may comprise a memory storing instructions, that when executed by the one or more processors, cause the device to perform functions comprising switching, from a normal mode of the operating system, into an accessibility mode of the operating system, and the accessibility mode may be common to the plurality of software applications. The functions also may comprise receiving a selection of a user-interface item of a user-interface of a given software application, and the user-interface item may have a text in a first language. The functions further may comprise, based on the operating system being in the accessibility mode, obtaining, by the operating system in response to the selection, a translation of the text into a second language. The functions also may comprise obtaining a voice output corresponding to a spoken utterance of the translation of the text; and providing the voice output.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
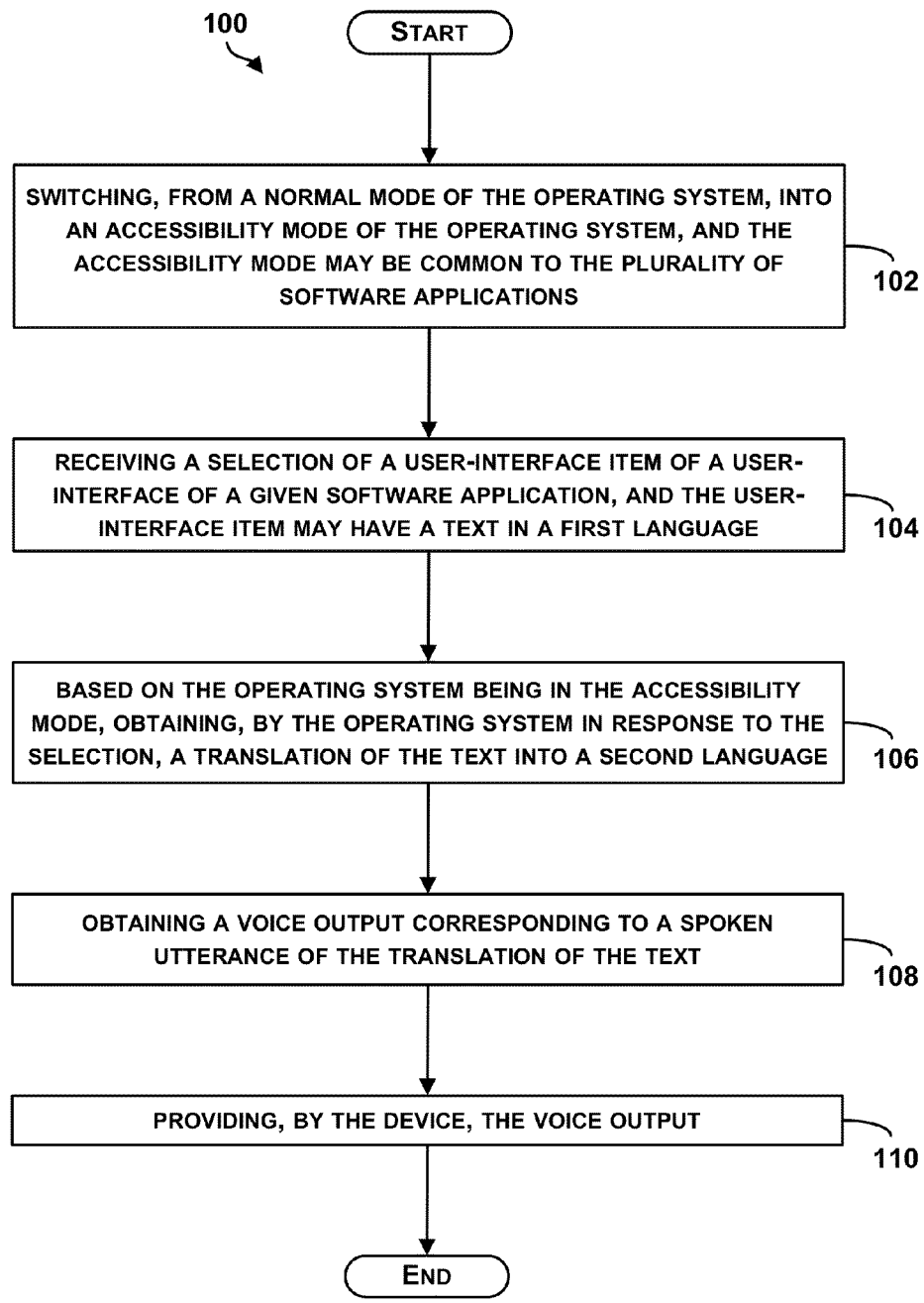
FIG. 1 is a flowchart of an example method for generating a voice output corresponding to a text to enhance device accessibility, in accordance with an embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

In examples, a computing device (e.g., a mobile telephone, personal digital assistant (PDA), laptop, notebook, or netbook computer, tablet computing device, a wearable computing device, etc.) may include multiple software applications, and each software application may have a user-interface to enable interaction by a user of the computing device. In these examples, a user-interface item of the user-interface may have a text (e.g., the text may be displayed on the user-interface item) that may be indicative of functionality of the user-interface item. For example, the software application may include an email application, and the user-interface of the email application may include an icon or button, i.e., a user-interface item, labeled "Send." The user-interface item may be user-selectable, and when selected, the computing device may be configured to send an email being composed in the email application, for example.

In some examples, the text of the user-interface item may be in a given language (e.g., English) while a user of the computing device may not be a native speaker of, or may not be familiar with, the given language, and the user thus may not be able to understand the text or functionality of the user-interface item. This language barrier may impede accessibility of the computing device and the software application to the user.

In an example, the computing device may be configured to include a separate translation software application. The user may access the separate translation software application to input the text of a user-interface item of a software application currently being used, and may switch from the software application to the translation software application to obtain a translation of the text. The user may then switch back to the software application being used and continue to use the software application.

In another example, the computing device may be configured to include and execute an operating system, and the operating system further may be configured to support a plurality of software applications and a plurality of modes of operation of the computing device. The computing device may be configured to cause the operating system to be in an accessibility mode (common to the plurality of software applications) to enhance interaction with the user. In the accessibility mode, the operating system may be configured to receive a selection of the user-interface item of any software application, and to provide a translation of the text (e.g., generate a display of respective text of the translation on the user-interface) while the user is interacting with the software application without switching back and forth between the software application and a given translation software application.

In still another example, the operating system may be configured to obtain, in response to the selection, a voice output corresponding to a spoken utterance of the translation of the text into a second language. Further, the operating system may be configured to provide the voice output at the computing device (e.g., cause the voice output to be played at the computing device through a speaker coupled to the computing device) while the user is interacting with the software application. In this manner, interaction of the user with the software application may be minimally disrupted and accessibility may be enhanced.

FIG. 1 is a flowchart of an example method for generating a voice output corresponding to a text to enhance device accessibility, in accordance with an embodiment.

The method 100 may include one or more operations, functions, or actions as illustrated by one or more of blocks 102-110. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation In addition, for the method 100 and other processes and methods disclosed herein, the flowchart shows functionality and operation of one possible implementation of present examples. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 100 and other processes and methods disclosed herein, each block in FIG. 1 may represent circuitry that is wired to perform the specific logical functions in the process.

At block 102, the method 100 includes switching, from a normal mode of the operating system, into an accessibility mode of the operating system, and the accessibility mode may be common to the plurality of software applications. In examples, the operating system may be configured to support a plurality of software applications and a plurality of modes of operation of a device. The device can be, for example, a mobile telephone, personal digital assistant (PDA), laptop, notebook, or netbook computer, tablet computing device, a wearable computing device, etc.

An operating system configured to be executed on the device may include software configured to manage hardware resources of the device and provide common services for a plurality of software applications that can run on the device. Several types of operating systems may exist, such as a real-time operating system (a multitasking operating system configured to be execute real-time software applications); a multi-user operating system (configured to allow multiple users to access the device concurrently); a multi-tasking or single tasking operating system (depending on whether one software application or multiple software applications are allowed to run at a given point in time); a distributed operating system (configured to manage a group of independent devices and make them perform as a single device); and an embedded operating system (designed to be used in embedded computing systems and configured to operate on small devices such as mobile phones or PDAs). These operating system types are examples for illustration only and other types exist.

The device may include hardware such as an input device (e.g., a keyboard, a touchscreen, a mouse, etc.), an output device (e.g., a display), a speaker, a microphone, a memory, etc. Other hardware components are possible. To perform functions of the hardware such as input, output, and memory allocation, an operating system, configured to be executed on the device, may be configured to act as an intermediary between software applications and the hardware. In some examples, the software applications may be executed by the hardware and may be configured to communicate with the operating system and be interrupted by the operating system.

The operating system may be configured to cause different parts or components of the device to work together. For example, the operating system may be configured to process requests made by the software applications to use any of the hardware such as a mouse or keyboard. In another example, the operating system may be configured to connect to a network.

The operating system may be configured to support a variety of networking protocols, and applications for using the networking protocols. In this manner, devices running dissimilar operating systems can participate in a common network for sharing resources such as computing, files, using either wired or wireless connections. The operating system may thus be configured to access, through the network, resources of a remote computer (e.g., a server) to files, computer's graphics, software modules, or sound hardware, for example.

A given software application of the software applications may be configured to interact with a user through a user-interface. The user-interface may be configured to request services from the operating system, which may be configured to acquire data from hardware (e.g., a keyboard, mouse, touchscreen, etc.). Example services may include displaying prompts and status messages on output hardware devices, such as a display device. The user-interface may include a command-line interface, where device commands may be typed out line-by-line, and/or may include a graphical user-interface, where a visual environment (e.g., windows, icons, menus, pointers, etc.) may be present.

To facilitate interaction of the user with respective user-interfaces of the plurality of software applications supported by the operating system of the device 200, the operating system may be configured to switch from a normal mode of operation to an accessibility mode of operation. The accessibility mode may be associated with enhancing a user's interaction with the plurality of software applications.

At block 104, the method 100 includes receiving a selection of a user-interface item of a user-interface of a given software application, and the user-interface item may have a text in a first language.

Figure 2A:
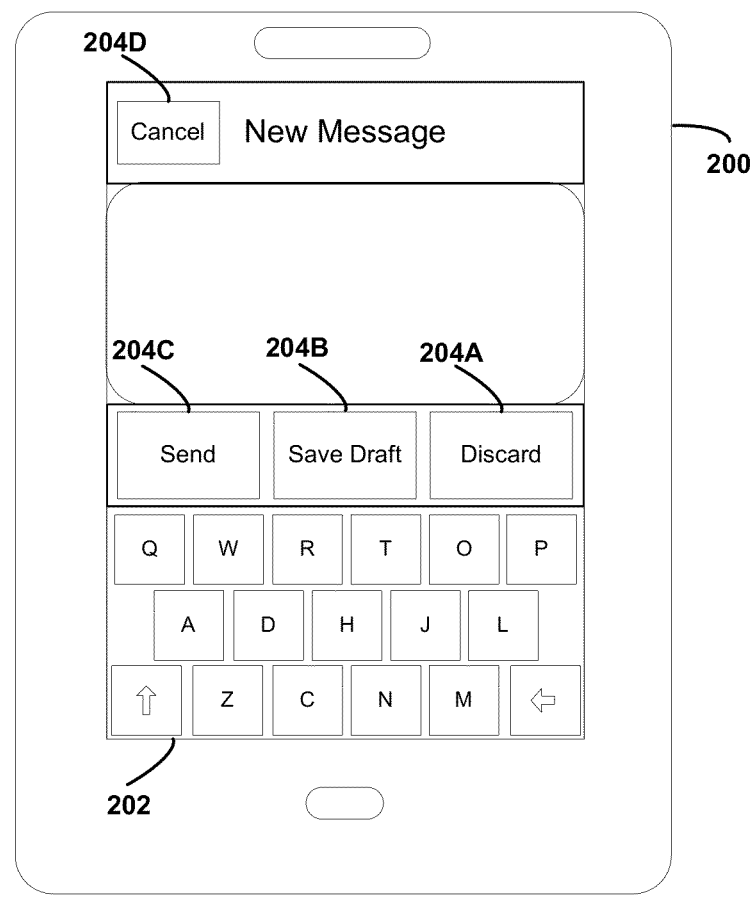
FIG. 2A illustrates an example device and an example user-interface, in accordance with an embodiment.

FIG. 2A illustrates an example device 200 and an example user-interface, in accordance with an embodiment. An operating system of the device 200 may be configured to be executed on the device 200, support a plurality of software applications, and may be configured to support a plurality of modes of operation of the device 200. FIG. 2A shows the device 200 including a display 202 (e.g., a touchscreen), and running an email software application as an example. The email software application includes a user-interface depicted on the display 202, and the user-interface may include a plurality of user-interface items such as icons, menus with menu items, and user-selectable on-screen buttons such as the buttons 204A, 204B, 204C, and 204D. A respective text is associated with each of the buttons 204A-D and is visually presented on a respective button. For example, the button 204A has a text "Discard" displayed on or within a display space of the button 204A.

In examples, a given function or action (e.g., sending an email, discarding an email, etc.) may be associated with each user-interface item of the user-interface. The operating system of the device 200 may be configured to determine functionality of a given user-interface item (e.g., the button 204A) and determine a respective description of the functionality. In these examples, a respective text associated with the given user-interface item may include given text displayed on the given user-interface item in addition to a description of the functionality of the given user-interface item.

The buttons 204A-D may be user-selectable. Selection of a button may be associated with a press or tap on the button, for example. As an example, assuming the display 202 is a touch-screen, selecting the button 204A may include touching or contacting the button 204A on the display 202. Other selection mechanisms are possible.

Referring back to FIG. 1, at block 106, the method 100 includes, based on the operating system being in the accessibility mode, obtaining, by the operating system in response to the selection, a translation of the text into a second language. As examples, referring to FIG. 2A, respective texts of the buttons 204A-D may be displayed in a given language (e.g., English) while a user of the device 200 may not be familiar with the given language, and the user thus may not be able to understand the respective texts or corresponding functionalities of the buttons 204A-D.

For example, the operating system, being in the accessibility mode, may be configured to alleviate the language barrier and facilitate interaction of the user with the user-interface by translating a respective text of a respective user-interface item (e.g., one of the buttons 204A-D) from a source language to a target language. As described above, the respective text associated with the respective user-interface item may include a given text displayed on the respective user-interface item in addition to a description of respective functionality of the respective user-interface item.

In one example, the operating system may be configured to determine the target language from settings (e.g., manually selected by the user) in the device 200. In another example, the operating system may be configured to recognize the target language from history of use of the device 200 (e.g., Internet browsing history, language used by the user to enter text in previous instances, etc.) or from a user's profile or preferences stored on the device 200.

In an example, the accessibility mode may be activated or initiated in the operating system and may thus be common to the plurality of software applications, i.e., the accessibility mode may be active in the operating system and available for all software applications regardless of which software application is currently being interacted with. In this manner, instructions associated with the accessibility mode may be executed in the operating system, while the operating system communicates with any software application and an associated user-interface. In examples, the operating system may be configured to continuously be in the accessibility mode; however, in other examples, the operating system may be configured to receive a request (e.g., from the user) to initiate the accessibility mode.

Figure 2B:
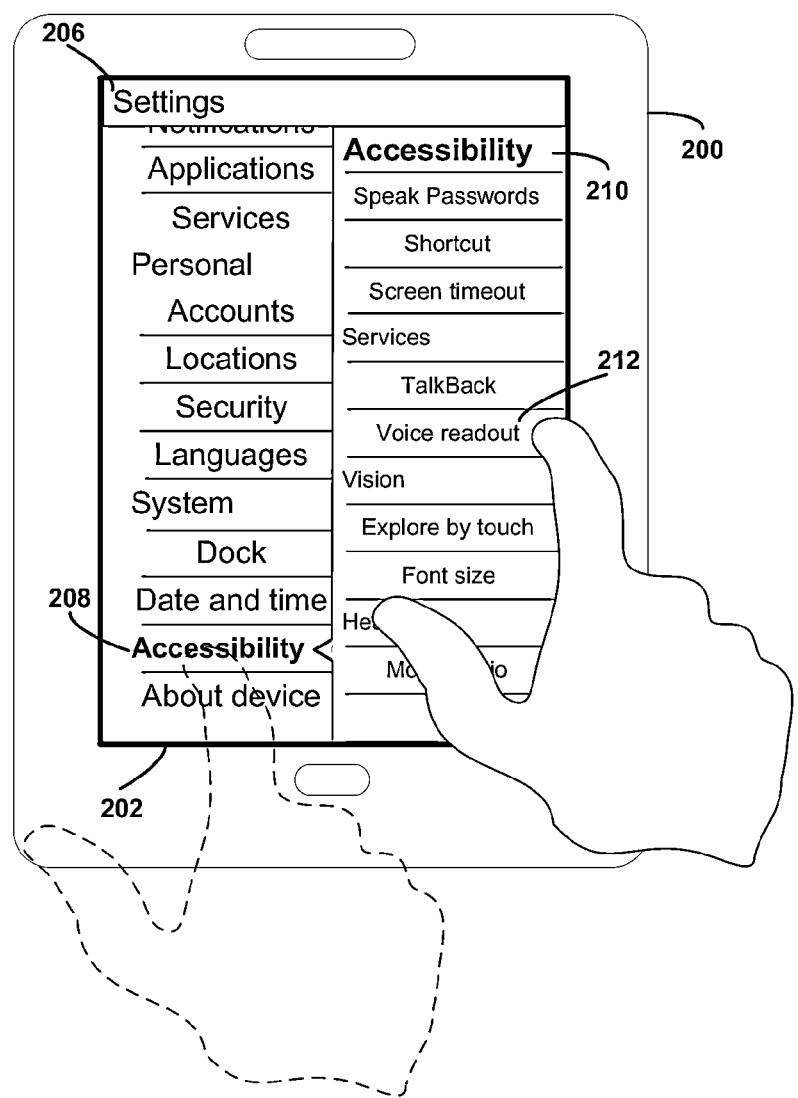
FIG. 2B illustrates an example initiation of an accessibility mode, in accordance with an embodiment.

FIG. 2B illustrates an example initiation of an accessibility mode, in accordance with an embodiment. As shown in FIG. 2B, the user may be able to navigate through menus and menu items relating to the operating system of the device 200. Although text shown on the menus and menu items illustrated in FIG. 2B is in English, the text can be in any language and may be set by the user of the device 200 such that the user can navigate through the menus. As an example, the user may be able to navigate to a "Settings" menu 206 and select "Accessibility" menu item 208. The operating system may be configured to receive a respective command associated with the "Accessibility" menu item 208 and accordingly cause an accessibility mode of operation of be initiated. In some examples, receiving a selection of "Accessibility" menu item 208 may cause a submenu 210 to be displayed, and the submenu 210 may include submenu items that, when selected, can cause corresponding features of the accessibility mode to be activated. These menu options and wording are for illustration only, and any other menu configurations, options, wording can be used.

Figure 2C:
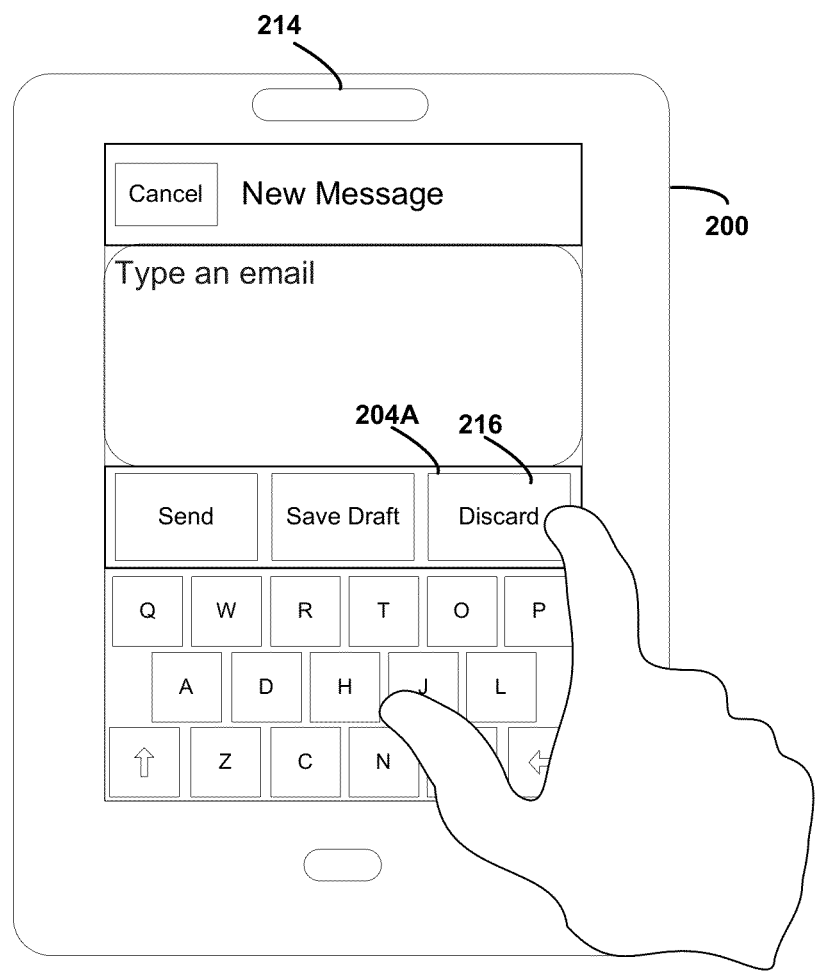
FIG. 2C illustrates example aspects of an accessibility mode, in accordance with an embodiment.

FIG. 2C illustrates example aspects of an accessibility mode, in accordance with an embodiment. FIG. 2C shows the email software application depicted in FIG. 2A with the accessibility mode initiated. As an example, the operating system of the device 200 may be configured to receive a selection of the button 204A, and accordingly may be configured to cause the text "Discard" to be translated into a target language.

In one example, the operating system may be configured to have access to a translation module coupled to the device 200 and may be configured to cause the translation module to translate the text of the button 204A from a source language into a target language.

In another example, the translation module may reside at one or more servers in wired or wireless communication (e.g., through the Internet) with the device 200 and the operating system of the device 200. As an example, the translation module may reside in a single server or may be distributed between more than one servers. In this example, the operating system may be configured to provide the text of the button 204A to the one or more severs and receive the translation of the text from the one or more servers.

In an example, the translation module (whether at the device 200 or at a server) may be configured to utilize computational linguistics to translate a text from a source language to a target language. In one example, the translation module may be configured to perform substitution of words in the source language for words in the target language. In another example, the translation module may be configured to recognize whole phrases and identify closest counterparts in the target language. To accomplish this task, for instance, the translation module may be configured to utilize statistical techniques so as to handle differences in linguistic typology, translation of idioms, and isolation of anomalies.

In one example, the translation module may be configured to allow for customization by domain or software application type, improving output by limiting scope of allowable substitutions. Customization may be effective in domains or software applications where formal or formulaic language may be used.

As examples, the translation module may be configured to use one or more of several translation techniques such as rule-based translation, statistical-based translation, and example-based translation.

Rule-based translation (also known as "knowledge-based translation" or "classical approach" of machine translation) may be considered as a general term that denotes machine translation systems based on linguistic information about source and target languages retrieved from (bilingual) dictionaries and grammars covering the main semantic, morphological, and syntactic regularities of each language respectively. Having input words or sentences (in a source language), a rule-based system may be configured to generate output sentences (in a target language) on the basis of morphological, syntactic, and semantic analysis of both the source and the target languages.

Statistical machine translation may be considered as a machine translation paradigm where translations are generated on the basis of statistical models whose parameters are derived from analysis of bilingual text corpora (e.g., the Canadian Hansard corpus, the English-French record of the Canadian parliament and EUROPARL, the record of the European Parliament, etc.).

Example-based machine translation may be considered as a method of machine translation characterized by use of a bilingual corpus with parallel texts as a main knowledge base at run-time. Example-based machine translation may be considered as a translation by analogy and can be viewed as an implementation of case-based reasoning approach of machine learning. As an example, using example-based machine translation may include decomposing a sentence into certain phrases, then translating these phrases, and composing the translated phrases into one sentence. Phrasal translations may be accomplished by analogy to previous translations. The principle of translation by analogy may be encoded to an example-based machine translation system through example translations used to train such a system.

Referring back to FIG. 1, at block 108, the method 100 includes obtaining a voice output corresponding to a spoken utterance of the translation of the text. Referring to FIG. 2B, as an example, if "Voice readout" submenu item 212 is selected, the operating system may be configured to cause a voice readout feature of the accessibility mode to be initiated or activated. Upon initiation of the voice readout feature the operating system, for example, may be configured to cause the text of a given user-interface item, selected by the user, to be translated from a first language (e.g., English) to a second language (e.g., Chinese) as described above at block 106 of the method 100, and convert a translation of the text into a voice output corresponding to a spoken utterance, in the second language, of the translation.

Referring to FIG. 2C, the operating system of the device 200 may be configured to receive a selection of the button 204A, as described at block 104 of the method 100, and accordingly may be configured to cause the text "Discard" to be translated into a target language and to cause a voice output corresponding to a spoken utterance of a translation of the text "Discard" to be synthesized in the target language.

In examples, the operating system may be configured to have access to a speech synthesizer coupled to the device 200, and the operating system may be configured to provide the translation of the text to the speech synthesizer and utilize the speech synthesizer to convert the translation of text into a synthesized voice in the target language. As an example, the voice output (i.e., the synthesized voice) may include a recitation or narration of the text displayed on the button 204A and/or a description of a functionality of the button 204A.

In one example, the speech synthesizer may be coupled to the device 200. In another example, the speech synthesizer may reside at one or more servers in wired or wireless communication (e.g., through the Internet) with the device 200 and the operating system of the device 200. As an example, the speech synthesizer may reside in a single server or may be distributed between more than on servers. In examples, the translation module and the speech synthesizer may reside at the one or more servers. In these examples, the operating system may be configured to provide the text of the button 204A, for instance, to the one or more servers, where the translation of the text is determined and the voice output is synthesized, and may be configured to receive the voice output from the one or more servers.

In still another example, the task of obtaining or determining the voice output can be distributed between the operating system of the device 200 and respective operating systems at the one or more servers. As an example for illustration, the device 200 may include the translation module and the one or more servers may include the speech synthesizer, or vice versa. In yet still another example, the task of synthesizing the voice output may be partially done at the device 200 while a portion of the task is performed at the one or more servers.

To synthesize a voice output, the device 200 (or the one or more servers) may be configured to include a text-to-speech (TTS) module to convert the translation of text into speech. In an example, the TTS module may include and be configured to execute software (e.g., speech synthesis algorithm) as well as include hardware components (e.g., memory configured to store instructions, a speaker, etc.). In examples, the TTS module may include two portions: a front-end portion and a back-end portion. The front-end portion may have two tasks; first, the front-end portion may be configured to convert raw text containing symbols like numbers and abbreviations into equivalent written-out words. This process may be referred to as text normalization, pre-processing, or tokenization. The front-end portion also may be configured to assign phonetic transcriptions to each word, and divide and mark the text into prosodic units, such as phrases, clauses, and sentences. The process of assigning phonetic transcriptions to words may be referred to as text-to-phoneme or grapheme-to-phoneme conversion. Phonetic transcriptions and prosody information together may make up a symbolic linguistic representation that is output by the front-end portion. The back-end portion, referred to as synthesizer, may be configured to convert the symbolic linguistic representation into sound. In some examples, this part may include computation of a target prosody (pitch contour, phoneme durations), which may then be imposed on output speech. Thus, the TTS module may be configured to generate or synthesize a speech waveform that corresponds to the translation of the text.

With the increase in the power and resources of computer technology, building natural-sounding synthetic voices has progressed from a knowledge-based activity to a data-based one. Rather than hand-crafting each phonetic unit and applicable contexts of each phonetic unit, high-quality synthetic voices may be built from sufficiently diverse single-speaker databases of natural speech. Diphone systems may be configured to use fixed inventories of pre-recorded speech. Other techniques such as unit-selection synthesis may include using sub-word units (pre-recorded waveforms) selected from large databases of natural speech. In unit-selection techniques synthesis, quality of output may derive directly from quality of recordings; thus, the larger the database the better the quality. Further, limited domain synthesizers, where the database has been designed for a particular software application, may be configured to optimize synthetic output.

A basic unit-selection premise is that new naturally sounding utterances can be synthesized by selecting appropriate sub-word units from a database of natural speech. A unit-selection synthesis system may be configured to use large databases of recorded speech. During database creation, each recorded utterance is segmented into some or all of the following: individual phones, diphones, half-phones, syllables, morphemes, words, phrases, and sentences. Division into segments may be done, for example, using a modified speech recognizer set to a "forced alignment" mode with manual correction afterward, using visual representations such as the waveform and a spectrogram. An index of the units in the speech database can then be created based on the segmentation and acoustic parameters like fundamental frequency (pitch), duration, position in the syllable, and neighboring phones. At run time, a desired target utterance is created by determining a chain of candidate units from the database (unit-selection) that meets certain criteria such as optimization of a target cost, i.e., how well a candidate unit from a database matches a required unit, and a concatenation cost, which defines how well two selected units may be combined.

Another unit-selection technique referred to as clustering-based unit-selection technique, may allow the target cost to be pre-calculated. Units of the same type may be clustered into a decision tree that depicts questions about features available at the time of synthesis. The cost functions may be formed from a variety of heuristic or ad hoc quality measures based on features of an acoustic signal and given texts, for which the acoustic signal is to be synthesized. In an example, target cost and concatenation cost functions based on statistical models can be used.

As an alternative to selection of actual instances of speech from a database, statistical parametric speech synthesis can be used to synthesize speech. Statistical parametric synthesis may be described as generating an average of sets of similarly sounding speech segments. This may contrast with the target of unit-selection synthesis, i.e., retaining natural unmodified speech units. Statistical parametric synthesis may include modeling spectral, prosody (rhythm, stress, and intonation of speech), and residual/excitation features. An example of statistical parametric synthesis is Hidden Markov Model (HMM)-based speech synthesis. In an example statistical parametric speech synthesis system, parametric representations of speech including spectral and excitation parameters from a speech database can be extracted and then modeled using a set of generative models (e.g., HMMs).

Some machine translation systems may also be configured to translate speech from a source language into speech in a target language. Thus, in an example, instead of translating a text from a source language into a respective text of a target language and then synthesizing a voice output, the device 200 or the one or more servers may be configured to synthesize a respective voice output in the source language and then translating the voice output into a corresponding voice output in the target language.

Referring back to FIG. 1, at block 110, the method 100 includes providing, by the device, the voice output. Referring to FIG. 2C, the operating system of the device 200 may be configured to cause the voice output corresponding to the text to be played through a speaker 214 coupled to the device 200, for example. As described above, the voice output may include a recitation of a given text (i.e., "Discard") displayed on the button 204A, in addition to a narration of a description of the functionality of the button 204A (e.g., "this button causes a composed email to be discarded"). The operating system may be configured to cause the voice output to be played at the device 200 while the user-interface is displayed, and the user may not switch to a different software application to obtain a translation of the text.

In an example, the operating system may be configured to generate a display of the translation of the text such that the user may be able to read the translation in addition to or alternative to listening to the voice output. For instance, the operating system may be configured to replace the label "Discard" of the button 204A with an equivalent word in a target language, at least for a predetermined amount of time. In another example, the translation may be displayed next to the button 204A. In still another example, the operating system may be configured to cause the translation to be displayed in a pop-up window. Other display configurations are possible.

In one example, in addition to providing the voice output at the device 200, the operating system may be configured to provide a visual indication emphasizing the user-interface item 204A on the display 202. For example, as shown in FIG. 2C, a rectangle 216 is displayed on the button 204A to indicate that the voice output is associated with the button 204A. The rectangle 216 may be removed after the voice output stops playing, for example. In another example, the operating system may be configured to change a color of the button 204A, or cause the letter of the "Discard" to be in boldface or italicized, etc. These visual indications are examples for illustration only, and any other type of visual indication can be used to emphasize the user-interface item that the voice output is associated with.

In the accessibility mode, the operating system may be configured to differentiate between a selection of the user-interface item (e.g., the button 204A) indicative of a request for a respective voice output to be determined and played at the device 200, and a respective selection of the user-interface item to trigger a command or action associated with the user-interface item. As an example for illustration, the operating system may be configured to identify a single tap on the button 204A as a selection of the button 204A to request the voice output; and may be configured to identify two consecutive taps (e.g., within a predetermined amount of time), as a respective request to trigger an action associated with the button 204A. In another example, the operating system may be configured to differentiate between a press and quick release on the button, and a press and hold on the button 204A. In still another example, a first tap may cause the voice output to be determined and played at the device 200, and then a second tap afterwards may trigger the command or action. Other selection mechanisms for differentiation are possible. These selection mechanisms may be set in the device 200 by the user of the device 200, for example.

In examples, the method of FIG. 1 enables an operating system of a computing device to perform accessibility functions for any software application running on the device so that each individual software application does not require specific programming to perform such functions. For instance, the operating system can determine when a request is received during execution of any software application for a translation of a text item of the software application, and the operating system can perform functions needed to translate the text item and provide an output on the computing device (as either a display of a translation or a voice output of the translated text). In this way, the computing device is programmed with the operating system to operate in this manner, and the individual software applications do not require specific programming to perform such accessibility functions. In some instances, the software applications may include settings to allow the operating system to operate in this manner (e.g., a software application may prohibit such operation when determinations of selection of text for translation may conflict with general functions of the software application).

Figure 3:
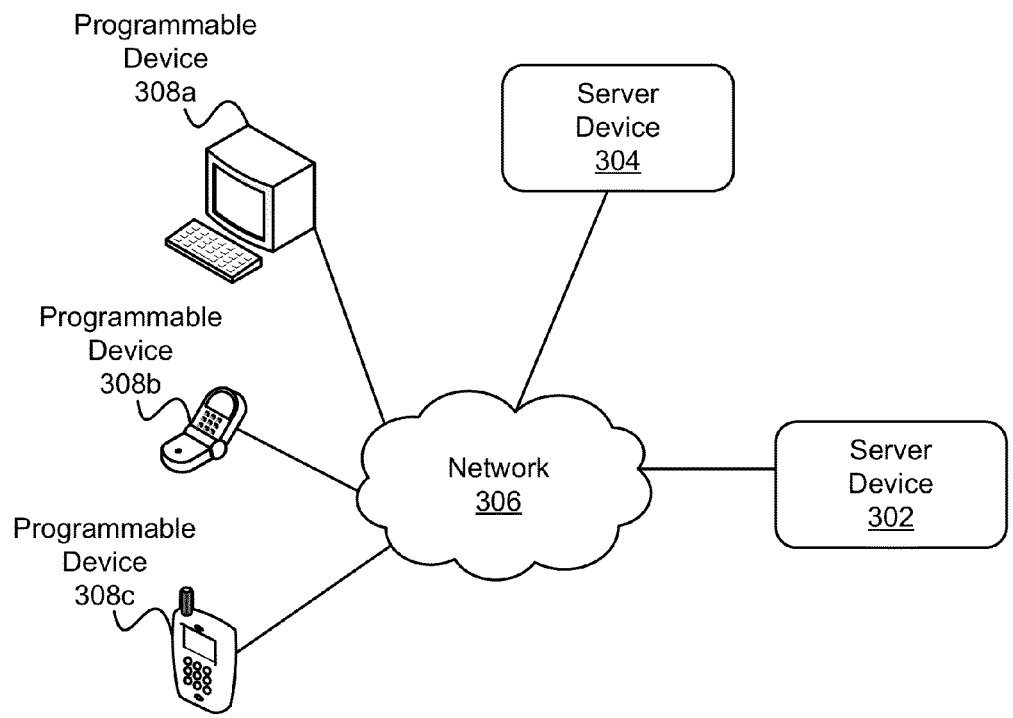
FIG. 3 illustrates an example distributed computing architecture, in accordance with an example embodiment.

FIG. 3 illustrates an example distributed computing architecture, in accordance with an example embodiment. FIG. 3 shows server devices 302 and 304 configured to communicate, via network 306, with programmable devices 308a, 308b, and 308c. The network 306 may correspond to a LAN, a wide area network (WAN), a corporate intranet, the public Internet, or any other type of network configured to provide a communications path between networked computing devices. The network 306 may also correspond to a combination of one or more LANs, WANs, corporate intranets, and/or the public Internet.

Although FIG. 3 shows three programmable devices, distributed application architectures may serve tens, hundreds, or thousands of programmable devices. Moreover, the programmable devices 308a, 308b, and 308c (or any additional programmable devices) may be any sort of computing device, such as an ordinary laptop computer, desktop computer, network terminal, wireless communication device (e.g., a tablet, a cell phone or smart phone, a wearable computing device, etc.), and so on. In some examples, the programmable devices 308a, 308b, and 308c may be dedicated to the design and use of software applications. In other examples, the programmable devices 308a, 308b, and 308c may be general-purpose computers that are configured to perform a number of tasks and may not be dedicated to software development tools.

The server devices 302 and 304 can be configured to perform one or more services, as requested by programmable devices 308a, 308b, and/or 308c. For example, server device 302 and/or 304 can provide content to the programmable devices 308a-308c. The content can include, but is not limited to, web pages, hypertext, scripts, binary data such as compiled software, images, audio (e.g., synthesized text-to-speech signal), and/or video. The content can include compressed and/or uncompressed content. The content can be encrypted and/or unencrypted. Other types of content are possible as well.

As another example, the server device 302 and/or 304 can provide the programmable devices 308a-308c with access to software for database, search, computation, graphical, audio (e.g. speech synthesis), video, World Wide Web/Internet utilization, and/or other functions. Many other examples of server devices are possible as well.

The server devices 302 and/or 304 can be cloud-based devices that store program logic and/or data of cloud-based applications and/or services. In some examples, the server devices 302 and/or 304 can be a single computing device residing in a single computing center. In other examples, the server device 302 and/or 304 can include multiple computing devices in a single computing center, or multiple computing devices located in multiple computing centers in diverse geographic locations. For example, FIG. 3 depicts each of the server devices 302 and 304 residing in different physical locations.

In some examples, data and services at the server devices 302 and/or 304 can be encoded as computer readable information stored in non-transitory, tangible computer readable media (or computer readable storage media) and accessible by programmable devices 308a, 308b, and 308c, and/or other computing devices. In some examples, data at the server device 302 and/or 304 can be stored on a single disk drive or other tangible storage media, or can be implemented on multiple disk drives or other tangible storage media located at one or more diverse geographic locations.

Figure 4A:
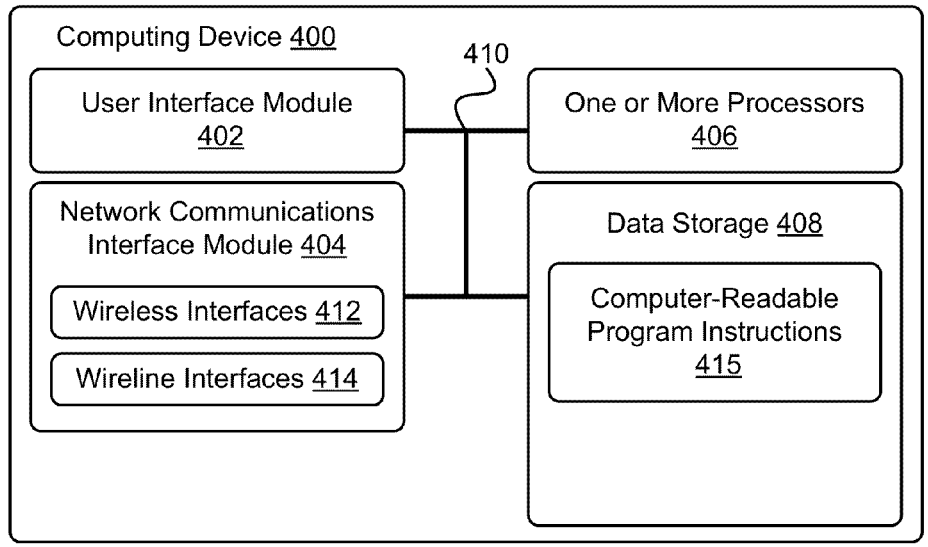
FIG. 4A is a block diagram of an example computing device, in accordance with an example embodiment.

FIG. 4A is a block diagram of a computing device (e.g., system) in accordance with an example embodiment. In particular, computing device 400 shown in FIG. 4A can be configured to perform one or more functions of the server devices 302, 304, network 306, and/or one or more of the programmable devices 308a, 308b, and 308c. The computing device 400 may include a user-interface module 402, a network communications interface module 404, one or more processors 406, and data storage 408, all of which may be linked together via a system bus, network, or other connection mechanism 410.

The user-interface module 402 can be operable to send data to and/or receive data from external user input/output devices. For example, user-interface module 402 can be configured to send and/or receive data to and/or from user input devices such as a keyboard, a keypad, a touchscreen, a computer mouse, a track ball, a joystick, a camera, a voice recognition/synthesis module, and/or other similar devices. The user-interface module 402 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. The user-interface module 402 can also be configured to generate audible output(s) (e.g., synthesized speech), and may include a speaker, speaker jack, audio output port, audio output device, earphones, and/or other similar devices.

The network communications interface module 404 can include one or more wireless interfaces 412 and/or one or more wireline interfaces 414 that are configurable to communicate via a network, such as network 306 shown in FIG. 3. The wireless interfaces 412 can include one or more wireless transmitters, receivers, and/or transceivers, such as a Bluetooth transceiver, a Zigbee transceiver, a Wi-Fi transceiver, a LTE transceiver, and/or other similar type of wireless transceiver configurable to communicate via a wireless network. The wireline interfaces 414 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, the network communications interface module 404 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

The processors 406 can include one or more general-purpose processors and/or one or more special purpose processors (e.g., digital signal processors, application specific integrated circuits, etc.). The processors 406 can be configured to execute computer-readable program instructions 415 that are contained in the data storage 408 and/or other instructions as described herein (e.g., the method 100).

The data storage 408 can include one or more computer-readable storage media that can be read and/or accessed by at least one of processors 406. The one or more computer-readable storage media can include volatile and/or non-volatile storage components, such as optical, magnetic, organic or other memory or disc storage, which can be integrated in whole or in part with at least one of the processors 406. In some examples, the data storage 408 can be implemented using a single physical device (e.g., one optical, magnetic, organic or other memory or disc storage unit), while in other examples, the data storage 408 can be implemented using two or more physical devices.

The data storage 408 can include computer-readable program instructions 415 and perhaps additional data, such as but not limited to data used by one or more processes and/or threads of a software application. In some examples, data storage 408 can additionally include storage required to perform at least part of the herein-described methods (e.g., the method 100) and techniques and/or at least part of the functionality of the herein-described devices and networks.

Figure 4B:
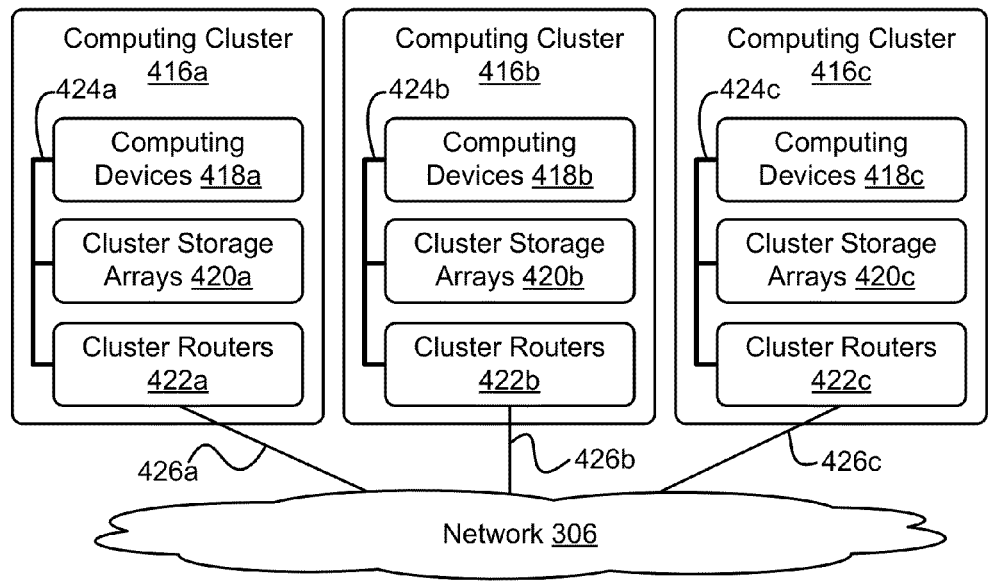
FIG. 4B illustrates a cloud-based server system, in accordance with an example embodiment.

FIG. 4B depicts a cloud-based server system, in accordance with an example embodiment. In FIG. 4B, functions of the server device 302 and/or 304 can be distributed among three computing clusters 416a, 416b, and 416c. The computing cluster 416a can include one or more computing devices 418a, cluster storage arrays 420a, and cluster routers 422a connected by a local cluster network 424a. Similarly, the computing cluster 416b can include one or more computing devices 418b, cluster storage arrays 420b, and cluster routers 422b connected by a local cluster network 424b. Likewise, computing cluster 416c can include one or more computing devices 418c, cluster storage arrays 420c, and cluster routers 422c connected by a local cluster network 424c.

In some examples, each of the computing clusters 416a, 416b, and 416c can have an equal number of computing devices, an equal number of cluster storage arrays, and an equal number of cluster routers. In other examples, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In the computing cluster 416a, for example, the computing devices 418a can be configured to perform various computing tasks of the server device 302. In one example, the various functionalities of the server device 302 can be distributed among one or more of computing devices 418a, 418b, and 418c. The computing devices 418b and 418c in the computing clusters 416b and 416c can be configured similarly to the computing devices 418a in computing cluster 416a. On the other hand, in some examples, the computing devices 418a, 418b, and 418c can be configured to perform different functions.

In some examples, computing tasks and stored data associated with server devices 302 and/or 304 can be distributed across computing devices 418a, 418b, and 418c based at least in part on the processing requirements of the server devices 302 and/or 304, the processing capabilities of computing devices 418a, 418b, and 418c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 420a, 420b, and 420c of the computing clusters 416a, 416b, and 416c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of the server devices 302 and/or 304 can be distributed across computing devices 418a, 418b, and 418c of computing clusters 416a, 416b, and 416c, various active portions and/or backup portions of these components can be distributed across cluster storage arrays 420a, 420b, and 420c. For example, some cluster storage arrays can be configured to store the data of the server device 302, while other cluster storage arrays can store data of the server device 304. Additionally, some cluster storage arrays can be configured to store backup versions of data stored in other cluster storage arrays.

The cluster routers 422a, 422b, and 422c in computing clusters 416a, 416b, and 416c can include networking equipment configured to provide internal and external communications for the computing clusters. For example, the cluster routers 422a in computing cluster 416a can include one or more internet switching and routing devices configured to provide (i) local area network communications between the computing devices 418a and the cluster storage arrays 420a via the local cluster network 424a, and (ii) wide area network communications between the computing cluster 416a and the computing clusters 416b and 416c via the wide area network connection 426a to network 306. The cluster routers 422b and 422c can include network equipment similar to the cluster routers 422a, and the cluster routers 422b and 422c can perform similar networking functions for the computing clusters 416*b* and 416*c* that the cluster routers 422*a* perform for the computing cluster 416*a*.

In some examples, the configuration of the cluster routers 422*a*, 422*b*, and 422*c* can be based at least in part on the data communication requirements of the computing devices and cluster storage arrays, the data communications capabilities of the network equipment in the cluster routers 422*a*, 422*b*, and 422*c*, the latency and throughput of the local networks 424*a*, 424*b*, 424*c*, the latency, throughput, and cost of wide area network links 426*a*, 426*b*, and 426*c*, and/or other factors that can contribute to the cost, speed, fault-tolerance, resiliency, efficiency and/or other design goals of the moderation system architecture.

In one example, the configurations illustrated in FIGS. 3 and 4A-4B can be used for implementations described with respect to the method 100. For example, the translation module and/or the speech synthesizer can be implemented at cloud-based devices (e.g., server devices 302 and/or 304). In this example, the operating system of a device (e.g., the programmable devices 308*a-c* in FIG. 3, or the computing devices 418*a-c* of FIG. 4B) can provide a text to the cloud-based devices and receive the translation and/or the voice output from the cloud-based devices.

Figure 5:
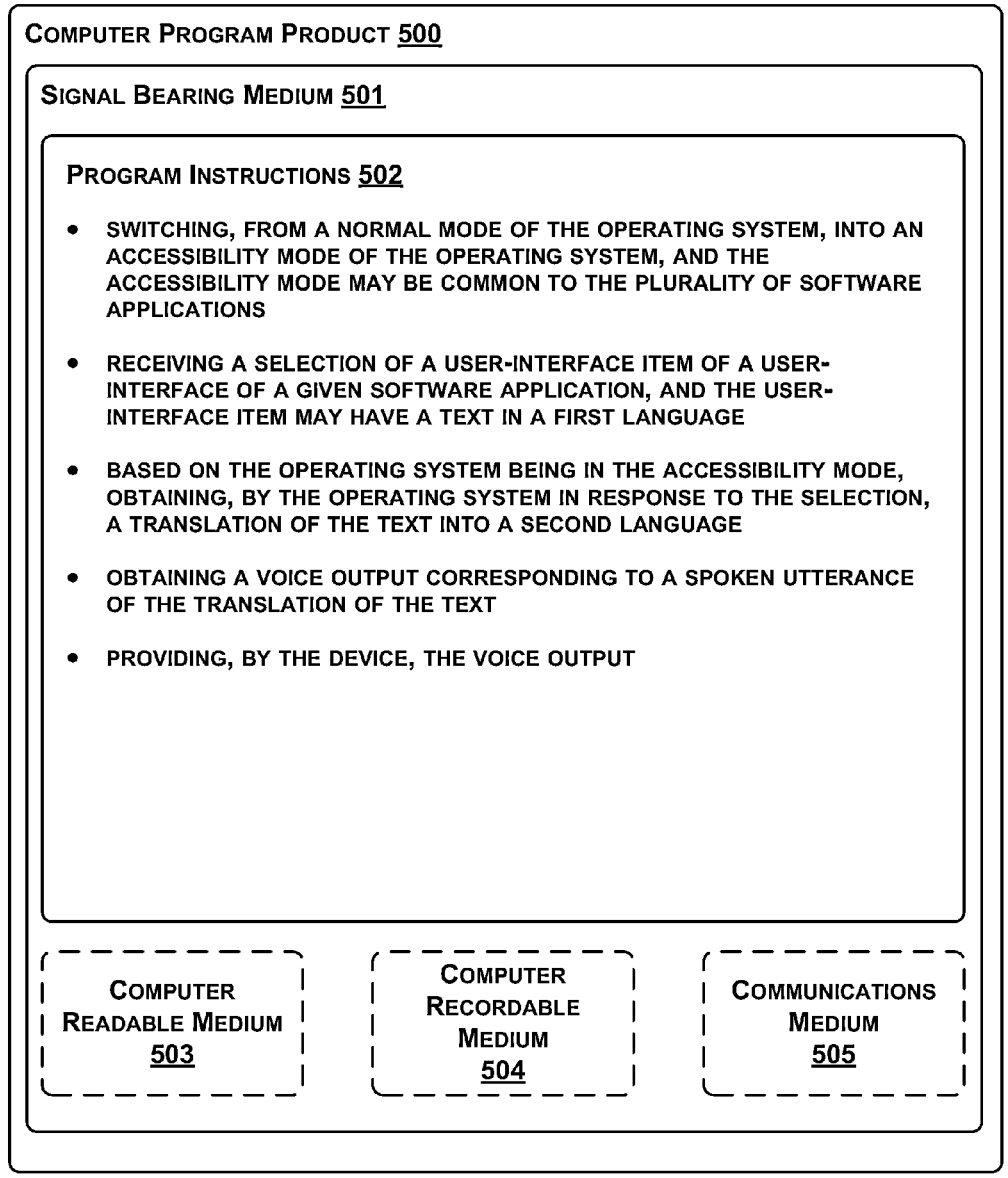
FIG. 5 is a schematic illustrating a conceptual partial view of an example computer program product that includes a computer program for executing a computer process on a computing device, arranged according to at least some embodiments presented herein.

In some examples, the disclosed methods (e.g., the method 100) may be implemented as computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 501. The signal bearing medium 501 may include one or more programming instructions 502 that, when executed by one or more processors may provide functionality or portions of the functionality described above with respect to FIGS. 1-4B. In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 504, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming to the IEEE 802.11 standard or other transmission protocol).

The one or more programming instructions 502 may be, for example, computer executable and/or logic implemented instructions. In some examples, a computing device such as the programmable devices 308*a-c* in FIG. 3, or the computing devices 418*a-c* of FIG. 4B may be configured to provide various operations, functions, or actions in response to the programming instructions 502 conveyed to programmable devices 308*a-c* or the computing devices 418*a-c* by one or more of the computer readable medium 503, the computer recordable medium 504, and/or the communications medium 505.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method performed by a computing device having an operating system and a plurality of software applications, the method comprising:
   switching, from a normal mode of the operating system, into an accessibility mode of the operating system, wherein the accessibility mode is common to the plurality of software applications;
   receiving a selection of a user-interface item of a user-interface of a given software application, wherein the user-interface item has a text in a first language;
   based on the operating system being in the accessibility mode, obtaining, by the operating system in response to the selection, a translation of the text into a second language and a description of a functionality of the user-interface item in the second language;
   obtaining, by the computing device, a voice output corresponding to a spoken utterance of the translation of the text and to the description of the functionality of the user-interface item; and
   providing, by the computing device, the voice output.

2. The method of claim 1, further comprising determining the second language based on history of use of the computing device.

3. The method of claim 1, wherein the user-interface item is a user-selectable icon or a menu item and the text is indicative of functionality, in the given software application, associated with the user-selectable icon or menu item.

4. The method of claim 1, wherein obtaining the translation of the text comprises:
   providing the text to a translation module in communication with the operating system; and
   receiving, from the translation module, the translation of the text into the second language.

5. The method of claim 4, wherein obtaining the voice output comprises utilizing a speech synthesizer to convert the translation of the text into a synthesized voice in the second language.

6. The method of claim 1, wherein the second language is user-selectable.

7. The method of claim 1, further comprising visually presenting the translation of the text on a display coupled to the computing device.

8. The method of claim 1, wherein obtaining the voice output comprises:
   providing the text to a speech synthesizer in communication with the operating system and a translation module, wherein the speech synthesizer is configured to determine, a synthesized voice in the first language corresponding to the text, and wherein the translation module is configured to convert the synthesized voice into a respective synthesized voice in the second language; and receiving, from the translation module, the respective synthesized voice in the second language.

9. The method of claim 1, further comprising determining, by the operating system, that the selection is indicative of a request for obtaining the voice output as opposed to a respective selection indicative of a respective request to execute a function associated with the user-interface item.

10. A non-transitory computer readable medium having stored thereon instructions that, when executed by one or more processors of a computing device having an operating system and a plurality of software applications, cause the computing device to perform functions comprising:

switching, from a normal mode of the operating system, into an accessibility mode of the operating system, wherein the accessibility mode is common to the plurality of software applications;

receiving a selection of a user-interface item of a user-interface of a given software application, wherein the user-interface item has a text in a first language;

based on the operating system being in the accessibility mode, obtaining, by the operating system in response to the selection, a translation of the text into a second language and a description of a functionality of the user-interface item in the second language;

obtaining a voice output corresponding to a spoken utterance of the translation of the text and to the description of the functionality of the user-interface item; and providing the voice output.

11. The non-transitory computer readable medium of claim 10, wherein the functions further comprise visually presenting the translation of the text on a display coupled to the computing device.

12. The non-transitory computer readable medium of claim 10, wherein the user-interface item is a user-selectable icon or a menu item and the text is indicative of functionality, in the software application, associated with the user-selectable icon or menu item.

13. The non-transitory computer readable medium of claim 10, wherein the functions further comprise determining the second language based on a history of use of the device.

14. The non-transitory computer readable medium of claim 10, wherein the function of obtaining the voice output comprises utilizing a speech synthesizer to convert the translation of the text into a synthesized voice in the second language.

15. A device having an operating system and a plurality of software applications, the device comprising:

one or more processors; and memory storing instructions, that when executed by the one or more processors, cause the device to perform functions comprising:

switching, from a normal mode of the operating system, into an accessibility mode of the operating system, wherein the accessibility mode is common to the plurality of software applications;

receiving a selection of a user-interface item of a user-interface of a given software application, wherein the user-interface item has a text in a first language;

based on the operating system being in the accessibility mode, obtaining, by the operating system in response to the selection, a translation of the text into a second language and a description of a functionality of the user-interface item in the second language;

obtaining a voice output corresponding to a spoken utterance of the translation of the text and to the description of the functionality of the user-interface item; and providing the voice output.

16. The device of claim 15, wherein the functions further comprise determining the second language based on a history of use of the device.

17. The device of claim 15, further comprising a display, wherein the functions further comprise visually presenting the translation of the text on the display.

18. The device of claim 15, wherein the functions further comprise:

causing the text to be translated from the first language to the second language; and causing a speech synthesizer in communication with the device to synthesize the voice output corresponding to a spoken utterance of the translation of the text.

* * * * *